US009081097B2

(12) United States Patent
Rao et al.

(10) Patent No.: US 9,081,097 B2
(45) Date of Patent: Jul. 14, 2015

(54) COMPONENT FRAME ENHANCEMENT FOR SPATIAL COMPOUNDING IN ULTRASOUND IMAGING

(75) Inventors: Bimba Rao, San Jose, CA (US); Ismayil M. Guracar, Redwood City, CA (US); Kutay F. Ustuner, Mountain View, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 495 days.

(21) Appl. No.: 13/461,109

(22) Filed: May 1, 2012

(65) Prior Publication Data

US 2013/0294665 A1 Nov. 7, 2013

(51) Int. Cl.
*G06K 9/00* (2006.01)
*G01S 15/89* (2006.01)

(52) U.S. Cl.
CPC ......... *G01S 15/8995* (2013.01); *G01S 15/8977* (2013.01)

(58) Field of Classification Search
None
See application file for complete search history.

(56) References Cited

U.S. PATENT DOCUMENTS

| 5,040,225 | A | 8/1991 | Gouge | |
|---|---|---|---|---|
| 5,148,810 | A | 9/1992 | Maslak et al. | |
| 5,235,986 | A | 8/1993 | Maslak et al. | |
| 5,261,408 | A | 11/1993 | Maslak et al. | |
| 5,351,305 | A | 9/1994 | Wood et al. | |
| 5,479,926 | A | 1/1996 | Ustuner et al. | |
| 5,566,674 | A * | 10/1996 | Weng | 600/443 |
| 5,575,286 | A | 11/1996 | Weng et al. | |
| 5,653,235 | A * | 8/1997 | Teo | 600/447 |
| 5,655,535 | A * | 8/1997 | Friemel et al. | 600/443 |
| 5,782,766 | A | 7/1998 | Weng et al. | |
| 6,014,473 | A | 1/2000 | Hossack et al. | |
| 6,117,081 | A | 9/2000 | Jago et al. | |
| 6,126,598 | A | 10/2000 | Entrekin et al. | |
| 6,126,599 | A | 10/2000 | Jago et al. | |
| 6,135,956 | A | 10/2000 | Schmiesing et al. | |
| 6,210,328 | B1 * | 4/2001 | Robinson et al. | 600/437 |
| 6,318,179 | B1 * | 11/2001 | Hamilton et al. | 73/606 |
| 6,358,209 | B1 * | 3/2002 | Ustuner et al. | 600/443 |
| 6,390,981 | B1 * | 5/2002 | Jago | 600/443 |
| 6,398,733 | B1 | 6/2002 | Simopoulos et al. | |
| 6,416,477 | B1 * | 7/2002 | Jago | 600/447 |
| 6,423,003 | B1 * | 7/2002 | Ustuner et al. | 600/443 |
| 6,432,054 | B1 | 8/2002 | Ustuner et al. | |
| 6,464,638 | B1 * | 10/2002 | Adams et al. | 600/443 |
| 6,527,720 | B1 | 3/2003 | Ustuner et al. | |
| 6,579,238 | B1 * | 6/2003 | Simopoulos et al. | 600/443 |
| 6,755,787 | B2 * | 6/2004 | Hossack et al. | 600/447 |

(Continued)

FOREIGN PATENT DOCUMENTS

WO  WO 2009128213 A1 * 10/2009 ............... G06T 5/00

OTHER PUBLICATIONS

U.S. Appl. No. 13/372,229, filed Feb. 13, 2012.

*Primary Examiner* — Chan Park
*Assistant Examiner* — Iman K Kholdebarin (57) ABSTRACT

Steered spatial compounding is provided in ultrasound imaging. Component frames of data associated with different spatial response are processed to identify different sources of signals. Matched filtering and/or spatial variance with erosion distinguish between sources of signals, such as distinguishing between (1) anatomical structure and (2) soft tissue and/or noise. The locations in the patient are segmented by the source of signals and different compounding is applied for the different sources.

19 Claims, 5 Drawing Sheets

(56) References Cited

U.S. PATENT DOCUMENTS

| | | |
|---|---|---|
| 6,790,181 B2 | 9/2004 | Cai et al. |
| 6,858,010 B2 | 2/2005 | Guracar et al. |
| 6,872,181 B2 | 3/2005 | Tirumalai et al. |
| 7,664,301 B2 | 2/2010 | Kim et al. |
| 7,664,326 B2 | 2/2010 | Tamura |
| 7,780,601 B2 | 8/2010 | Guracar et al. |
| 7,983,456 B2 * | 7/2011 | Rao et al. ............. 382/128 |
| 8,234,923 B2 * | 8/2012 | Ramamurthy et al. ....... 73/606 |
| 8,696,577 B2 * | 4/2014 | Freiburger ............. 600/443 |
| 2002/0111297 A1 * | 8/2002 | Oldham et al. ............. 514/8 |
| 2002/0167533 A1 | 11/2002 | Tirumalai et al. |
| 2003/0097068 A1 * | 5/2003 | Hossack et al. ............. 600/443 |
| 2005/0251039 A1 * | 11/2005 | Chalana et al. ............. 600/437 |
| 2007/0071292 A1 * | 3/2007 | Rao et al. ............. 382/128 |
| 2007/0083114 A1 | 4/2007 | Yang et al. |
| 2008/0072423 A1 * | 3/2008 | Finn ............. 29/854 |
| 2008/0294049 A1 * | 11/2008 | Guracar ............. 600/458 |
| 2008/0306382 A1 * | 12/2008 | Guracar et al. ............. 600/437 |
| 2009/0036977 A1 * | 2/2009 | Rassat et al. ............. 623/1.42 |
| 2009/0203997 A1 * | 8/2009 | Ustuner ............. 600/443 |
| 2010/0179522 A1 * | 7/2010 | Companion et al. ............. 606/10 |
| 2010/0310143 A1 | 12/2010 | Rao et al. |
| 2011/0125030 A1 * | 5/2011 | Bai et al. ............. 600/476 |
| 2011/0306025 A1 * | 12/2011 | Sheehan et al. ............. 434/267 |
| 2014/0213900 A1 * | 7/2014 | Noguchi ............. 600/437 |

* cited by examiner

COMPONENT FRAME ENHANCEMENT FOR SPATIAL COMPOUNDING IN ULTRASOUND IMAGING

BACKGROUND

The present invention relates to spatial compounding. Steered spatial compounding is used in clinical environments. One component frame of data is acquired by scanning along scan lines at one angle or pattern relative to a transducer. A second component frame of data is acquired by scanning along scan lines at a different angle or pattern. Each of the frames of data represents an overlapping region of a patient. The frames of detected data are compounded together and displayed as an image.

Steered spatial compounding increases the information content of ultrasound images and reduces speckle noise in ultrasound. Compounding component frames of data associated with different scan angles may reduce speckle and may produce a more continuous border in specular targets, such as muscle layers, ductal structures, and boundaries between different tissue types.

To compound, the steered ultrasound images are averaged. Averaging performs well for speckle variance reduction, but is not best suited for preserving the angled specular targets. For specular targets, the target is best matched to the component frame steered perpendicular to the target and not other component frames. Other components steered differently may not pick up the target as well, or may miss the target all together. Averaging all the component frames may diminish the level of such matched structures.

Non-linear compounding component frames, such as maximum compounding, may preserve matched structures. However, maximum compounding provides poor speckle reduction and is ridden with a host of other problems, such as motion artifacts and increased clutter noise.

BRIEF SUMMARY

By way of introduction, the preferred embodiments described below include methods, computer readable media, instructions, and systems for spatial compounding in ultrasound imaging. Component frames of data associated with different spatial response (e.g., different steering) are processed to identify different sources of signals. Matched filtering and/or spatial variance with erosion distinguish between sources of signals, such as distinguishing between (1) anatomical structure and (2) soft tissue and/or noise. The locations in the patient are segmented by the source of signals and different compounding is applied for the different sources.

In a first aspect, a method is provided for steered spatial compounding in ultrasound imaging. Steered component frames of data are acquired. The steered component frames of data represent an overlap region of a patient and are responsive to different imaging angles. Each of the steered component frames of data are filtered along different directions. The filtering provides multiple filtered component frames of data for each steered component frame of data. The multiple filtered component frames of data for each of the steered component frames are combined. The combining provides a combined component frame of data for each of the steered component frames of data. The combined component frames are segmented. The combined component frames of data are compounded together as a function of the segmenting. An image of the overlap region is generated from a result of the compounding.

In a second aspect, a non-transitory computer readable storage medium has stored therein data representing instructions executable by a programmed processor for spatial compounding in ultrasound imaging. The storage medium includes instructions for identifying first information in component frames of data with different spatial response, the first information identified with matched filtering, identifying second information in the component frames of data as a function of variance, segmenting locations in an overlap region represented by the component frames of data into at anatomic structures and at least another type, the segmenting being a function of the first and second information, combining the component frames of data for each of the locations, the combining being different for the locations associated with anatomic structures than for the locations associated with the at least other type, and generating a spatially compound image as a function of the combining.

In a third aspect, a system is provided for steered spatial compounding in ultrasound imaging. A beamformer is operable to acquire a sequence of steered frames of data responsive to different steering angles from a substantially same transducer position and representing an overlap region. A processor is configured to detect spatial variance in the steered frames, segment locations of the overlap region as a function of the spatial variance into locations for first and second types of signal, erode the locations for the first type of signals, and generate a compound image from the steered frames of data as a function of the locations for the first and second types of signal after the erosion. A display is operable to display the compound image.

Further aspects and advantages of the invention are discussed below in conjunction with the preferred embodiments. The present invention is defined by the following claims, and nothing in this section should be taken as a limitation on those claims.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION

No one combining method is best suited for the entire spatially compounded image. Instead, the image is segmented into soft tissue (speckle), noise, and anatomic structures or other combination of sources. Compounding appropriate to each segment is applied. An optimal method of combining the steered ultrasound images by location is used.

For ultrasound imaging, the component frames are pre-processed for segmentation. Most image processing techniques perform segmentation based on detailed analysis of the image data. Such an image analysis stage is computationally intensive as well as time-consuming. Rather than image analysis, matched filtering and/or variance with erosion processing is used. These types of processing may be well suited for use in a real time ultrasound system.

Prior knowledge of the system state, such as the beam directions, is used to set up matched filters. Matched or directional filtering may identify and enhance structures best imaged by individual ultrasound frames. For example, the specificity of the filtering is enhanced by taking a difference with an output of orthogonal filters with one filtering direction being along the steering direction.

Spatial variance distinguishes structures from soft tissue or noise. Erosion of the variance data may more specifically identify anatomical structure locations from the variance.

Other compounding processes or dynamic adaptations may be used in addition to variance with erosion and/or matched filtering. For example, the processes to preserve clinical marker information disclosed in U.S. Pat. Nos. 6,858,010 and/or 7,780,601, the disclosure of which is incorporated herein by reference, may be used. As another example, the steered spatial compounding using variance between component frames disclosed in U.S. Published patent application No. 20130208965 (application Ser. No. 13/372,229, filed Feb. 13, 2012), the disclosure of which is incorporated herein by reference, may be used.

Figure 1:
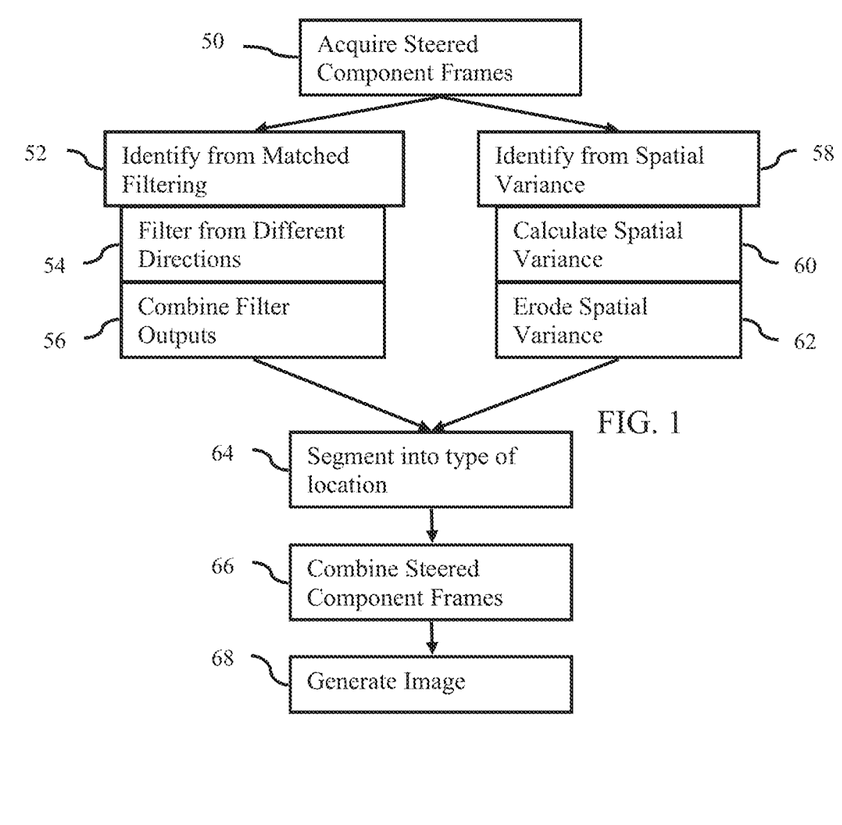
FIG. 1 is a flow chart diagram of one embodiment of a method for spatial compounding in ultrasound imaging.

FIG. 1 shows one embodiment of a method for spatial compounding in ultrasound imaging. The spatial compounding adapts to segmentation. To apply the appropriate combining, the image is segmented into soft tissue (speckle), noise, and anatomic structures. Other sources of signal or combinations of sources may be used. Image segmentation is performed via one or both of separate approaches—spatial variance with erosion and/or matched filtering of the component frames of data.

Figure 7:
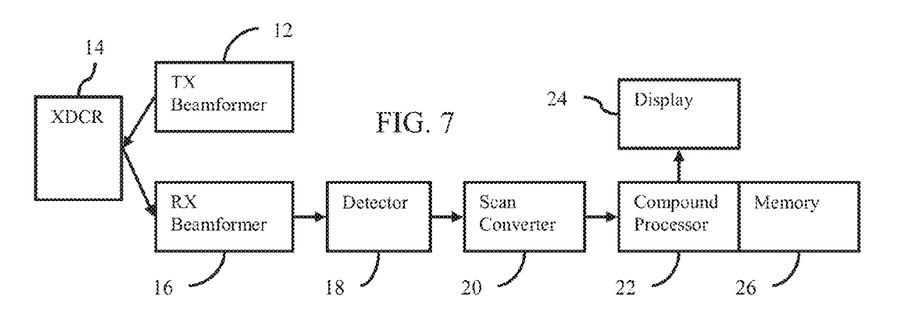
FIG. 7 is a block diagram of a system for spatial compounding in ultrasound imaging, according to one embodiment.

The method is performed by the system of FIG. 7 or a different system. The method is performed in the order shown or a different order. For example, acts 52-56 and 58-62 are performed simultaneously (e.g., in parallel) or sequentially in any order. Additional, different, or fewer acts may be provided. For example, acts 52-56 or acts 58-62 are not performed. As another example, acts 68 or 62 are not performed. In yet another example, further segmentation, such as image processing to locate edges (e.g., gradient processing), is performed.

Figure 2:
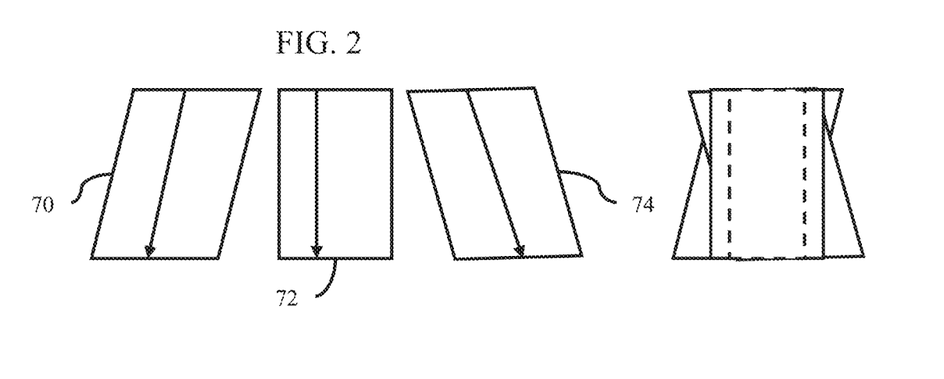
FIG. 2 is an example representation of three steered component frames of data.

In act 50, component frames of data are acquired. The component frames of data have different a spatial response. The component frames of data are steered electrically, mechanically, or by spatial positioning of the transducer. Each or multiple of the steered component frames of data are acquired at different steering angles. For example, FIG. 2 shows three electronically steered frames 70, 72, and 74 of data acquired in response to three different steering angles (see the ray line for each frame 70, 72, 74) or scan patterns with one or more scan lines at a different steering angle. Each of the component frames of data span a substantially same spatial extent of a region of a target, such by maintaining the transducer in a same position with or without intentional wobbling, positioning of the transducer(s). A majority, above 90% or almost the entire scanned region for each of the component frames of data overlaps with the scanned regions of the other component frames (see the dashed box).

One of the component frames of data is responsive to at least one different scan line angle relative to at least one location in the scanned region than another of the component frames of data. For at least some locations in the patient, the intersecting scan lines from the different component frames are at different angles, at least for two of the component frames. Insonifying the location from different directions provides a different spatial response.

In alternative embodiments, the transducer is moved during acquisition of sequential frames of data, such as associated with extended field of view imaging. Where non-linear scan patterns are used, where the transducer is rotated as well as translated, or where multiple transducers are spatially positioned to acquire the target images, different component frames of data may represent overlapping regions from different angles, providing a different spatial response. By combining the data for the overlapping regions, steered compounding is provided.

Two or more frames of data are acquired representing the same or different regions. For example, the scan lines of three component frames of data are each associated with a different region or scan geometry. The scan lines may be acquired in any format, such as linear, curved linear, sector curved sector, Vector®, curved Vector® and combinations thereof. For example, scan lines acquired with a linear transducer are steered at three different angles (e.g., +/−10 degrees and normal) in a linear or generally rectangular or parallelogram scan format for three component frames of data, respectively.

Figure 3A:
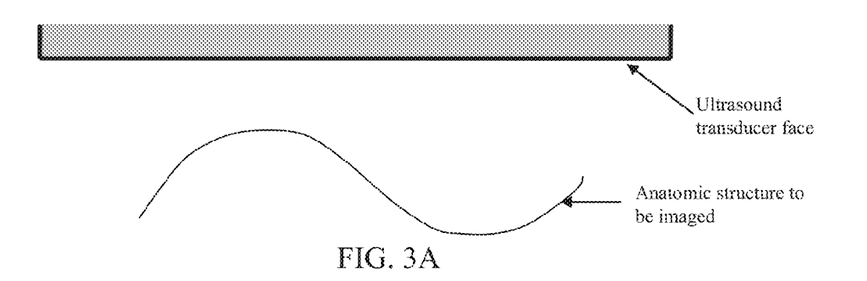
FIGS. 3A-D illustrate an example of matched filtering of anatomical structure relative to steering direction.
Figure 3B:
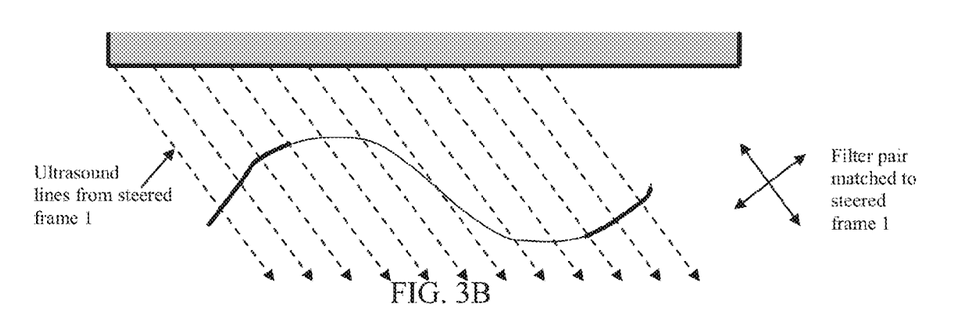
Figure 3C:
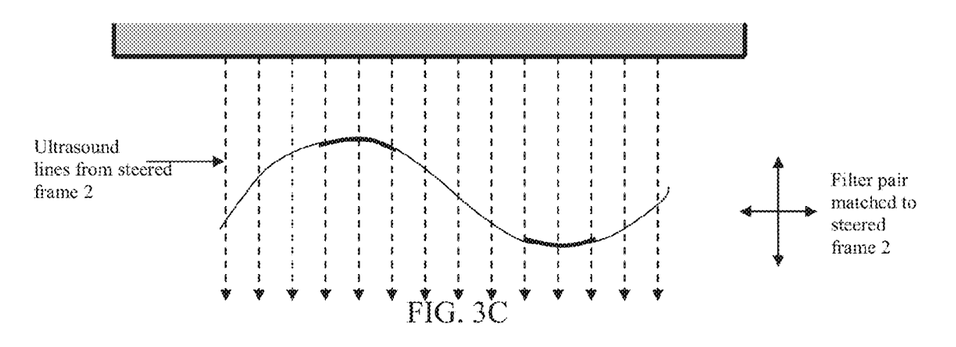
Figure 3D:
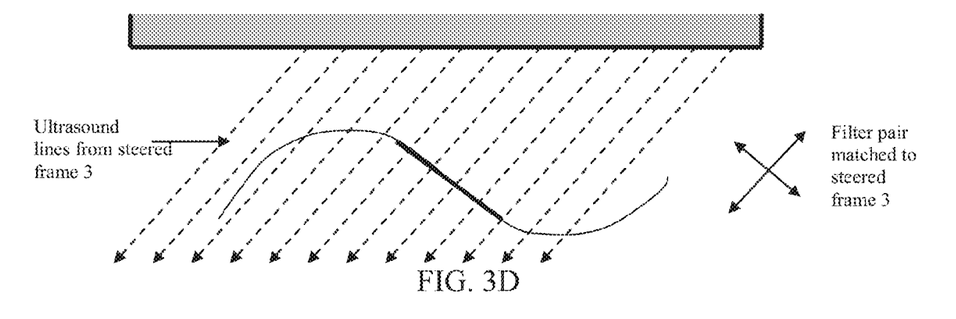

For one component frame of data, the scan lines originate at different positions on the transducer, but two or more scan lines may originate from a same position. Using the linear format, the scan lines are parallel and in a same direction relative to the intersections of the scan lines with the origins on the transducer. The majority of the scan lines of each component frame point in a same direction. FIGS. 3B, 3C, and 3D show an example. As another example, different angles from the face of the transducer 14 are provided by a scanning apex position on or behind the transducer 14 for sector or Vector® formats. The scan line density along the transducer surface is either uniform or changes as a function of the scan line position. The scan line density may be different for one frame of data as compared to another frame of data, such as having different uniform densities or having differences in variation of the density. Any of various combinations of formats or variation in scan line origin or angle within a single scan or between scans resulting in spatial diversity may be used, such as described in U.S. Published Patent Application No. 2002/167533-A1, the disclosure of which is incorporated herein by reference.

Each of the component frames of data corresponds to different steering angles or spatial response. For example, a majority of scan lines extend in a first direction, such as 10 degrees left from the transducer for one component frame of data. The majority of scan lines extend at a 10 degree right angle from the transducer for another component frame of data. The majority of the scan lines are normal to the transducer for a third component frame of data. Different steering angles other than plus or minus 10 degrees and zero may be used with 2, 3, 4 or more component frames.

In one embodiment, one component frame is associated with the maximum angle of steering provided by the transducer without undesired grating lobe effects. A second component frame is associated with the same angle but in a different direction relative to the transducer. Additional component frames, if any, are associated with lesser angles of steering. In alternative embodiments, the greatest steering angle is less than the maximum possible with the transducer.

As another example, the position of the scanning apex of the scan lines is different, such as spaced laterally, between two component frames of data, resulting in different steering angles. As yet another example, the scan lines are steered the same for each component frame of data, but the transducer is wobbled about an axis, such as the azimuth axis.

In addition to or as an alternative to steering, spatial diversity between component frames of data is provided by altering the aperture, apodization or other scan characteristic resulting in different spatial response. Any of various types of compounding may be used, such as: temporal compounding (i.e. each component frame acquired at a different time) or simultaneous acquisition of different component frames; frequency compounding (i.e. each component frame acquired in response to a different frequency characteristic) or component frames acquired with a same frequency; spatial compounding or component frames of data acquired with a same spatial response; steered spatial compounding or component frames of data acquired without steering; and combinations thereof.

In one embodiment, the same or substantially same scan lines are used for both transmit and receive operations for any given component frame of data. In alternative embodiments, one or more of the scan lines are different for transmit than for receive operation. For example, acoustic energy is transmitted along scan lines normal to the transducer for a linear array and received along scan lines at non-normal angles. For a curved array, the energy is transmitted along scan lines in one format and received along scan lines in a different format, pattern or positions. As another example, the same scan lines are used for transmit for all or multiple of the component frames of data, but different electric steering is provided during receive of each or multiple of the component frames of data as disclosed in U.S. Pat. No. 6,508,770, the disclosure of which is incorporated herein by reference.

In alternative embodiments, any of the various scanning methods and systems disclosed in U.S. Pat. Nos. 5,148,810, 5,235,986 and 5,261,408, the disclosures of which are incorporated herein by reference, may be used. The techniques disclosed in one or more of these patents show a Vector® scanning pattern using non-overlapping scan lines for obtaining a wider field of view with a transducer. Scan formats and apparatuses of one or more of the patents show the use of a common apex or vertex of the acoustic lines spaced behind the transducer, and the teachings therein may be used for positioning the common apex at different positions laterally relative to the transducer for obtaining component frames each associated with a different relative steering angle for the majority of scan lines. In other alternative embodiments, any of the spatial compounding techniques and associated acquisition of component frames with different steering angles disclosed in U.S. Pat. Nos. 6,117,081, 6,126,598, 6,126,599, 6,135,956 and 6,872,181, the disclosures of which are incorporated herein by reference, may be used.

The frame of data is samples representing the field of view or scanned region. The frame may be for a two or three-dimensional region. Different frames may be acquired in an interleaved manner, such as acquiring by lines or groups of lines for one frame interleaved with lines or groups of lines for another frame.

In act 52, information in component frames of data is identified with matched filtering. The information is identified by filtering from different directions in act 54 and then combining the results of the filtering in act 56. Additional, different, or fewer acts for matched filtering may be used.

The filtering and combining enhance anatomic structures relative to noise and soft tissue in the component frames of data. Anatomic structures may be tissue boundaries, muscle layers, ductal structures, valves, or other specular reflectors. While soft tissue is part of the anatomy, a region of soft tissue is not a specific anatomical structure, such as associated with a boundary. Soft tissue is primarily represented in ultrasound by speckle. The goal of the matched filter set is not only to segment out anatomic structures, but may also be to detect and enhance structures that are best imaged by individual steered component frames of data.

FIGS. 3A-D shows an anatomic structure illuminated by various steered ultrasound frames from a given transducer. Different parts of the same structure have greater acoustic return in different steered component frames. Structures that are best matched to a given steered ultrasound beam are specular reflectors (i.e., reflectors that are perpendicular to the steering angle). Ultrasound waves reflected from surfaces of these specular reflectors travel back to the transducer more than from surfaces at other angles, thus maximizing the visibility of these structures. For example, FIGS. 3B-D show different portions of the anatomic structure as highlighted (shown by a thicker portion) where more perpendicular to the scan lines. The scan lines are transmit scan lines, but may be receive scan lines. The matched filter attempts to find and preserve, for each of these steered component frames, the structures that are best imaged by that frame.

In act 54, the component frames of data are filtered. Any filtering may be used. In one embodiment, a low pass filter is applied. Band pass or high pass filtering may be used. Any kernel may be used, such as a Gaussian kernel. The kernel size is any number of locations, such as 10-20 locations. The kernel size may vary with frequency, such as being greater for higher frequencies due to increased resolution. Since the filtering is directional, the filter (i.e., kernel) is one-dimensional. In other embodiments, two or three-dimensional filtering may be used where a desired direction is emphasized (e.g., 20×3 kernel).

Figure 4:
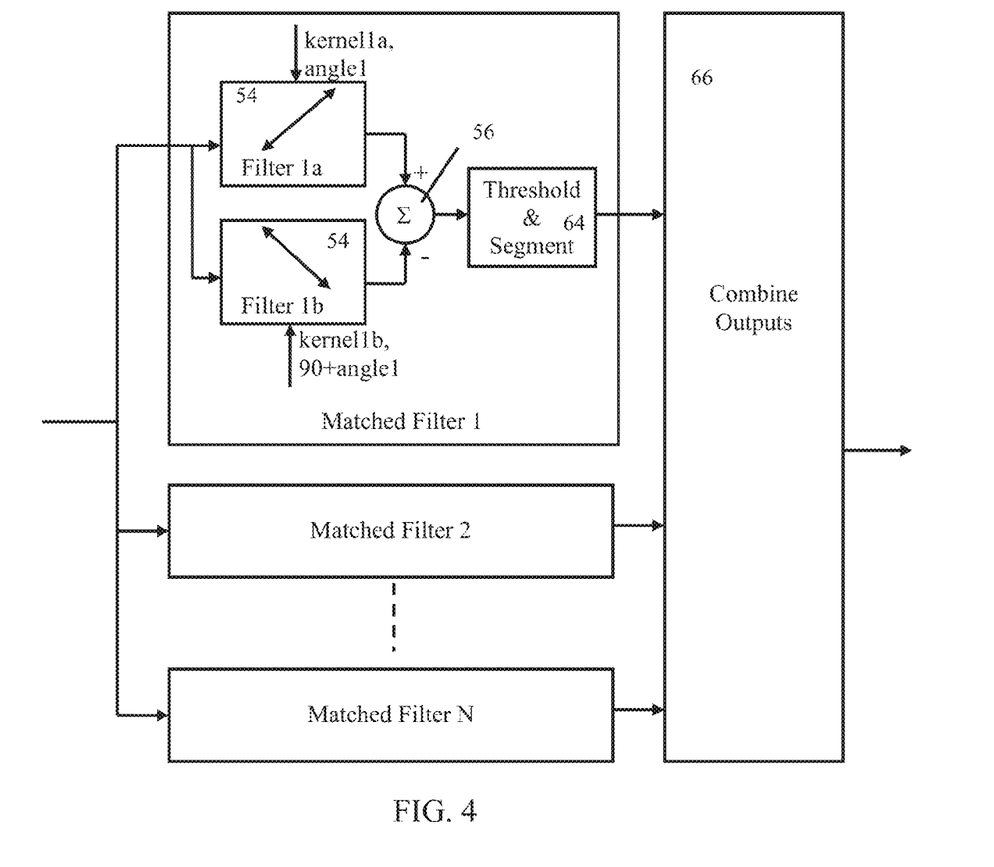
FIG. 4 shows one embodiment of a method for matched filtering in spatial compounding.

Each component frame of data is filtered multiple times along respective different directions. The filtering provides multiple filtered component frames of data for each steered component frame of data. Any number of different directions may be used. Optimal performance may be achieved by selection of the minimum set (e.g., two) of appropriate filters for the intended imaging application. FIGS. 3B-D and FIG. 4 shows filtering each component frame of data along two directions. FIG. 4 shows the two directional filters as a matched filter. Three or more filters may be used, such as where appropriate given expected anatomical structure relative to the acoustic window or transducer placement.

The directions are orthogonal or perpendicular. "Substantially" is used to account for patient movement, transducer movement, tolerances, and/or a difference within 10 degrees. A given steered component frame of data is filtered in perpendicular directions. The different directions may be non-perpendicular, such as two directions being 80-89 degrees from each other. Less perpendicular directions than 80 degrees may be used, such as where the anatomical structure is expected to have a specific angular relationship to the scan lines. Other directional filters that operate on structures that are partially matched to the scan angle may be included in the set. Where more than two directions are provided, equal or non-equal spacing of the directions around 360 degrees may be used.

The directions are set relative to the scan line directions. The transmit and/or receive scan lines are used. For any given location represented by a component frame of data, a scan line direction is provided. Where the scan lines are the same throughout the component frame of data (see FIGS. 3B-D), the directions of the filtering are the same throughout. Where the scan lines vary within the component frame of data, the directions vary depending on where the filter kernel is centered. Fixed filter directions may be used for varying scan line directions, such as using an average or median scan line direction.

One filtering direction is along the scan lines. The other filtering directions are perpendicular to the scan lines. For more than two directions, one filtering direction is set to be perpendicular to the scan lines and the other directions are set relative to the perpendicular direction. Alternatively, the initial direction is set to be substantially parallel to the scan line direction. The matched filter set includes filters that operate along the anatomical structures to increase detectability. Detectability is further improved by also filtering along the scan angle (i.e., perpendicular to the first filter).

Since the filtering directions are set relative to the scan line directions and the scan line directions for the various component frames of data are different, the matched filter sets for the different component frames of data are different. The directions used for filtering one component frame of data are different from at least one other component frame of data. FIGS. 3B-D show three different matched filtered sets with a corresponding three different sets of directions for the three different steering angles. FIG. 4 shows matched filter sets for N component frames.

The filtering provides multiple filtered component frames of data for each component frame of data. Where filtering is performed along two directions for each steered component frame of data, two resulting filtered component frames of data are provided for each input component frame of data. FIG. 4 shows each of N matched filters provided for the corresponding steered component frames of data.

In act 56 of FIG. 1, the multiple filtered component frames of data are combined. The results of directional filtering a given component frame of data are combined. Separate combinations are used for each of the component frames of data. The combination enhances the anatomical structure for the given component frame of data, so is performed for the matched filter set for that component frame. The result of the combination is a combined component frame of data for the given component frame of data. By combining for each matched filter set, a combined component frame of data is provided for each of the input component frames of data. The combined component frame of data has enhanced anatomical structure information for the given steering or spatial response.

Any combination may be used. As represented in FIG. 4, subtraction is used. One of the filtered component frames is subtracted from another. For example, the output from filtering perpendicular to the scan line direction is subtracted from the output from filtering along the scan line, or vise versa. The data representing the same locations are subtracted. The filtering and combination may be mathematically represented as a convolution equation:

$$\text{Output}(x, y) = \sum_{x'} \sum_{y'} \text{Input}(x', y') * \text{Filter}(x - x', y - y') \quad (1)$$

Other linear or non-linear combinations may be used, such as averaging. Where more that two directions of filtering are provided, weighted combination may be used. For example, the filtered component frame of data filtered along a scan line direction is weighted twice the weight of two other filtered component frames of data, and the two other filtered component frames of data are subtracted from the weighted frame filtered along the scan line direction.

The combination is repeated for each matched filter set (i.e., for each of the input component frames of data). The combination provides enhanced anatomical structure information. Information from other sources may cancel out or be less emphasized. The result is a combined frame of data with brighter reflectors having greater amplitude relative to other reflectors.

The matched filter set may be used to segment matched structures for each component frame, but may result in false positives in tissue. While working alone, the matched filtering may be combined with the spatial variance of acts 58-62. The identification of information from spatial variance is an alternate or additional robust tissue detector.

In act 58, information in the component frames of data is identified as a function of spatial variance. Variance estimation attempts to identify soft tissue regions using the local spatial variance. Soft tissue regions give rise to speckle. The statistics of fully developed speckle obey a Rayleigh distribution in the intensity domain. In the log domain, the distribution becomes Gaussian and the standard deviation is substantially a constant with a value of about 5.57 dB. The spatial variance may be used to discriminate soft tissue from bright reflectors (e.g., anatomical structures) and noise (e.g., clutter). Spatial variance may be used to distinguish between two, three, or more signal sources.

The spatial variance information is obtained by calculating the spatial variance in act 60 and eroding the locations associated with the greatest variance in act 62. Additional, different, or fewer acts may be used, such as not performing the erosion of act 62.

In act 60, the variance is calculated as a spatial variance. The variance is calculated separately for each component frame of data. Alternatively, the steered component frames of data are combined and spatial variance is calculated from the combination results. A variance frame is provided for each input component frame of data. Since the component frames of data have spatial diversity, the spatial variance is also different. In alternative embodiments, the variance includes both spatial and temporal variance.

Figure 5:
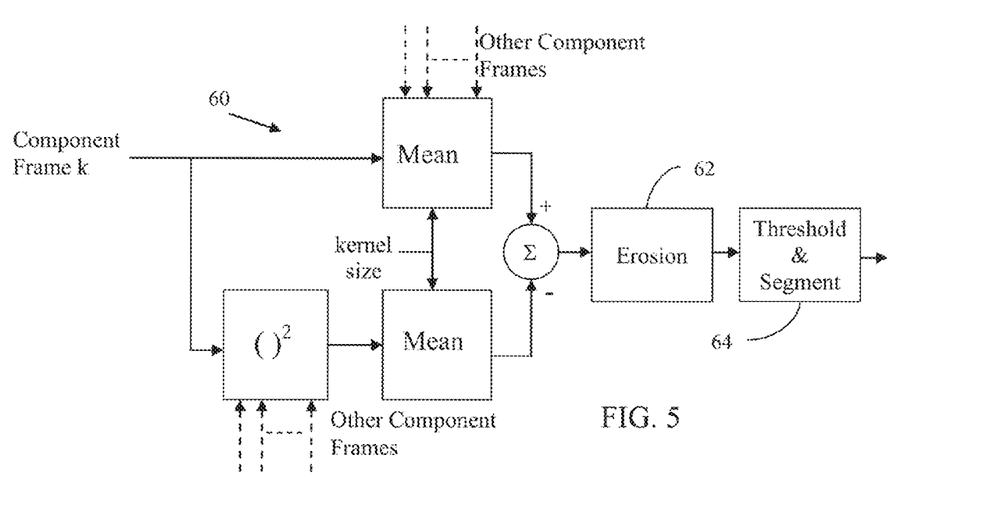
FIG. 5 shows one embodiment of a method for use of variance with erosion in spatial compounding.

Any measure of spatial variance may be used. In one embodiment represented in FIG. 5, the variance is calculated as a difference of a square of the mean E[X] from a mean of the square of the signal or data X. Alternatively, the spatial variance is used to determine a standard deviation. This is represented as:

$$\text{Variance}(X) = E[X^2] - E[X]^2$$

$$\text{StdDeviation}(X) = \sqrt{\text{Variance}(X)} \quad (2)$$

Any size kernel may be used. In one embodiment, the kernel for calculating the variance is a 10×10 kernel. The kernel size is fixed or may vary, such as a function of the imaging frequency (e.g., transmit and/or receive waveform frequency).

Variance estimation may distinguish between sources, but may thicken detected anatomical structures. To be sufficient to detect soft tissue given the speckle, the kernel may not be small enough to avoid thickening anatomical structures. In act 62, erosion is performed on the spatial variance frame of data.

Any erosion technique may be used. For example, the spatial variance data is low pass filtered. Any contiguous regions of high variance are then shrunk, such as by removing a layer of pixels or locations. Erosion removes pixels or locations on object boundaries. The number of pixels removed from the objects in a frame of data depends on the size and shape of a structuring element used to process the frame of data. In morphological erosion operations, the state of any given pixel or location in the output frame is determined by applying a rule to the corresponding pixel or locations and the neighbors in the input frame. Any amount of erosion may be used. In one embodiment, the value of the output location is the minimum of all or a majority of the values for the locations in the input neighborhood. Other erosion rules may be used.

The erosion is applied to the locations associated with anatomical structure. The thickening that may result from spatial variance kernel size is eroded for the anatomical structures. For the spatial variation frame of data, the region for anatomical structure is eroded. The erosion of anatomical structure results in region growing (dilation) for the locations associated with other signal sources, such as soft tissue or noise.

The erosion of act 62 may be applied as part of, prior to, or after segmentation. The segmentation of act 64 may include segmenting based on the spatial variance, matched filtering, or both. Using just the spatial variance information, variance associated with anatomical structure may be determined. The segmentation based on matched filtering or both spatial variance and matched filtering may be used for erosion. The spatial variation frame of data, after erosion, may be used in a further segmentation.

In act 64, the component frames of data are segmented. The segmentation assigns locations of the patient represented in the component frames to a source of signals. The locations in the overlap region are segmented. Locations outside of the overlap region may be segmented as well, such as segmenting the entire field of view for each of the component frames of data.

The segmentation is performed for each component frame of data. In the example of FIGS. 2 and 3, three steered component frames of data are provided. For each given location, three measures (i.e., from the three component frames) of the source are provided by the matched filtering or the spatial variance. The assignment of source for a given location is based on one or more of the measures. For example, a voting scheme is used. If two of the three measures indicate one source, then the location is segmented as that source. If there is equal voting, then one source may be given priority. For example, any of the component frames indicating anatomical structure is used to assign the location as anatomical structure. Other approaches may be used, such as assigning the location as anatomical structure if any frame indicates anatomical structure. Another approach is averaging. The segmentation may be based on weighting where the weights are assigned based on the indication from the various component frames. Rather than binary assignment, weights indicate the relative assignment.

Where different numbers of component frames overlap for locations, the same or different combination of segmentation may be used. For example, all of the component frames overlap in the overlap region. In the example of FIG. 2, three component frames represent locations in the overlap region. Outside of the overlap region, one or two component frames are provided for a given location. The same or different segmentation process is used for these locations.

Due to sampling in ultrasound, the specific locations represented by each component frame may be different. In this situation, interpolation or a nearest neighbor may be used. The locations in an output frame or image are used to determine locations from component frames to use for segmentation. In other embodiments, the component frames are scan converted to the display format. Each component frame represents locations interpolated to a same grid.

FIG. 4 shows segmenting based on the output of the matched filtering. The combined component frames of data are used for the segmenting. FIG. 5 shows segmenting based on the output of the erosion or other spatial variance output. The eroded spatial variance frames of data are used for the segmenting. The spatial variance information and/or the matched filtered information are used without further processing. Alternatively, low pass filtering is applied prior to and/or after segmenting.

The segmentation distinguishes between two or more sources. In one embodiment, anatomical structures are segmented relative to all or any other sources or type of signals. Soft tissue, as represented by speckle, is treated as belonging to noise. In other embodiments, the segmentation is between three types, such as anatomical structure, soft tissue (e.g., speckle), and noise (e.g., clutter noise). Soft tissue is treated differently from other noise. Other types may be used than anatomical structure, soft tissue, and/or noise.

The segmentation is performed by applying a threshold. The threshold is a preset value. Alternatively, the threshold adapts to return signals (e.g., based on a mean signal) and/or to the imaging application (e.g., different threshold for cardiac than for radiology). Locations above the threshold are assigned one type and locations less than the threshold are assigned another type. For example, the output of the matched filtering is thresholded. If the value (e.g., B-mode data) for a location is above a threshold, the location is assigned as an anatomical structure. Locations with any values below the threshold are assigned as another type (e.g., assigned as not anatomical structure). Locations with values equal to the threshold are assigned to either anatomical structure or the other type.

As an example using spatial variance, ranges may be used. Multiple thresholds are applied to distinguish between ranges. For example, the thresholds distinguish between anatomical structure, soft tissue, and other noise. Expected speckle variance is about 5.57 dB for soft tissue. Thresholds at 5 and 6 dB or other values provide a range for soft tissue. Since different types of tissue have different speckle characteristics, the threshold may be adaptive rather than preset. Values below the soft tissue range are associated with other noise, and values above the soft tissue range are associated with anatomical structure.

Figure 6:
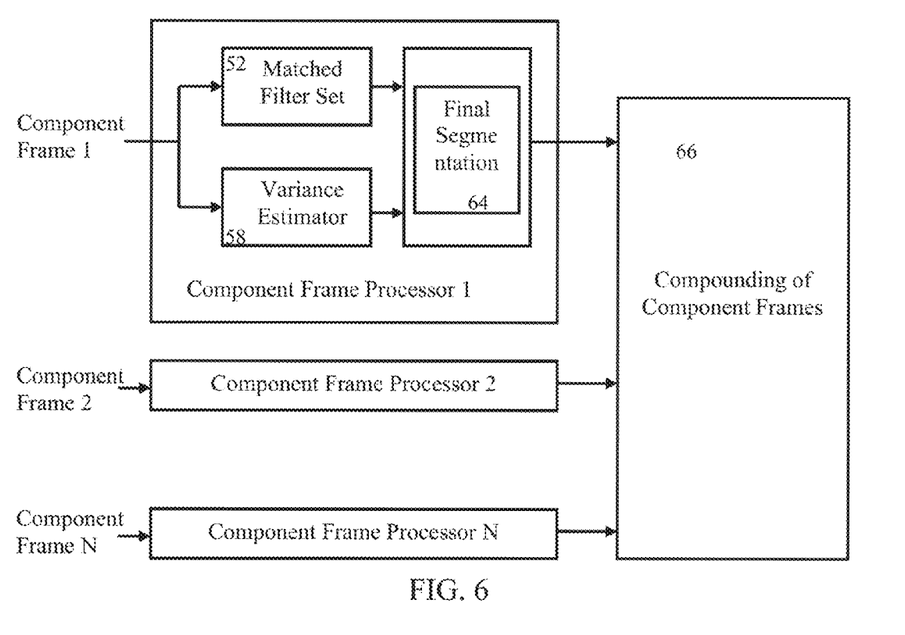
FIG. 6 shows an embodiment of a method for both use of variance with erosion and matched filtering in spatial compounding.

FIG. 6 shows an embodiment segmenting based on both the matched filtering and the spatial variance. The segmentations from both sources are combined. Output from both the variance filter and matched filter bank are used to segment the image into noise, soft tissue and anatomic structures. The matched filtering provides one indication of the source of signal for each location, and the spatial variance provides another. The location is assigned based on both sources of information. Any combination may be used. In one embodiment, the locations where both the matched filtering and the spatial variance indicate anatomic structure are assigned as corresponding to anatomic structures. Other locations are assigned as soft tissue and noise separately or as one group. A pixel is marked as anatomical structure if both filters mark the location as such. In another embodiment, locations are assigned as anatomical structure where one of the two output segmentation indicates anatomical structure and assigning all other locations as another type. Another approach is to use a weighted average of the two outputs. The weighting is used to select an amount of contribution for each type of combination.

In act 66, the component frames of data are combined. Once the locations or image are segmented, then the appropriate method is applied to compound each segment.

The combination is of the input or originally acquired component frames. The component frames may be low pass filtered or otherwise processed before combination. In other embodiments, the combination is of the frames output by the matched filtering, the spatial variance processing or both. The frames derived by matched filtering, spatial variance, or other processing may be combined.

The component frames include data representing specific locations. Where the frames of data represent the same locations or grid, the values from each frame representing a given location are combined. In one embodiment, detected and scan-converted frames of data are compounded together. Since scan-converted information is used, the data of each of the component frames are in a same format and grid pattern or spatial location sampling. Where the frames of data represent sampling along different grids, a nearest neighbor or interpolation is used to select or calculate the values used to combine. If the data is compounded prior to scan conversion, interpolation, extrapolation or other processes are used to compound any data representing adjacent or similar but not identical spatial locations.

The combination is for each location. The frames of data represent the same locations in at least the overlap region. Each of the component frames are compounded together for spatial locations representing the display or overlap region. Different locations may be associated with different numbers of frames and corresponding values. For example, an image representing more than the overlap region is generated. Due to steering, fewer component frames represent locations outside of the overlap region of all of the component frames. Any number of component frames may be used to determine the value for a given location, such as all of the frames for the overlap region and fewer than for all other locations.

The compounding is performed based on the segmenting. FIG. 6 shows using both matched filtering and spatial variance segmentation in compounding. The segmentation is used to determine the compounding used. Segmentation from just the matched filtering or just the spatial variance may be used in other embodiments.

Different combining is performed for the different types of signal sources. For example, one type of combination is performed for locations associated with anatomical structures than for locations associated with another type of source.

In one embodiment, the difference in combining is the technique used. The difference may be between using linear combination and non-linear combination. For example, a maximum selection is applied for locations associated with anatomical structure to maintain the brightness of anatomical structures. For soft tissue and/or noise, an average is applied. Weighted averaging may be used, such as emphasizing one component frame over others due to steering angle or motion between component frames. The average may reduce the variance associated with noise. Average compounding is applied to tissue and noise while maximum selection is applied to anatomic structures identified by the segmentation methods. Other linear or non-linear techniques may be used.

In another embodiment, the difference in combining is in weights applied. One component frame may be emphasized more than another for anatomical structure locations and less or no emphasis on one frame relative to another for other types of locations. Weights selected based on the segmentation or type of signal source are used. The selection of weights may use linear or non-linear criteria.

A single combination is made for a spatially compounded image. A sequence of images may be generated. New component frames are acquired in act 50. Each combination is of different component frames than for another combination. The component frames may be different by using a moving window, such that a given component frame is used in a plurality of combinations. The segmentation, output of filtering or variance calculation, or other information used in one combination may be stored and reused in subsequent combinations using the same component frame of data. The information may be recalculated as needed even for previously used frames in other embodiments. Alternatively, each component frame is acquired for one combination and not used in other combinations.

Referring again to FIG. 1, an image is generated in act 68. The compounded frame of values representing the locations in the patient is used to determine pixel or image values. The image is of the overlap region, but may include other locations. The image is a spatial compounded image generated from combining views. The compound frame is output from the compounding of act 66. Further processing may be used, such as spatially and/or temporally filtering the compounded frame of data. The image represents the patient, such as showing different tissue and other structures.

The signal-to-noise ratio for the image and/or for locations represented by the image may be better than if the component frames were averaged. By accounting for the sources of signal, anatomical structure information may be maintained or enhanced while reducing speckle or other noise. The resulting image may provide useful information about the patient not otherwise available or more difficult to identify.

FIG. 7 shows a system 10 for spatial compounding in ultrasound imaging. The system 10 is a medical diagnostic ultrasound system. In alternative embodiments, all or part of the system 10 is a workstation or computer for processing or displaying medical images.

The system 10 includes a transmit beamformer 12, a transducer 14, a receive beamformer 16, a detector 18, a scan converter 20, a compound processor 22, a display 24, and a memory 26. Different, fewer or additional components may be provided. For example, an offline workstation implements the compound processor 22 and display 24 without the additional ultrasound acquisition components.

The transducer 14 comprises an one- or multi-dimensional array of piezoelectric, ceramic, or microelectromechanical elements. In one embodiment, the transducer 14 is a one-dimensional array of elements for use as Vector®, linear, sector, curved linear, or other scan format now known or later developed. The array of elements has a wavelength, half wavelength, or other sampling frequency. A half-wavelength sampling of elements allows for greater steering angles, providing more spatial diversity for speckle reduction by compounding. The transducer 14 is adapted for use external to or use within the patient, such as a handheld probe, a catheter probe, or an endocavity probe. Multiple spatially distributed transducers or even scanning systems may be employed.

The transmit and receive beamformers 12, 16 operate as a beamformer. The beamformer is operable to acquire electronically or mechanically steered component frames of data responsive to different steering angles from a substantially same transducer position. The same scan pattern with different steering angles or different scan patterns resulting in different steering angles are used. Between two different scans, one or more scan lines may extend at a same angle from a same origin, but other scan lines are steered at different angles to provide component images responsive to different steering angles. For a given origin, at least one scan line may be at a different angle between the scans for two component frames of data. All or a majority of the scan lines may be steered differently for different frames.

The component frames of data represent different overlapping regions or a same region of the patient. The transducer 14 is substantially held in place for acquiring the component frames of data. "Substantially" is used to account for unintentional movement of the person holding the array, breathing or other motion caused by the patient, and any other incidental movement associated with using a probe not mounted in a fixed position relative to a patient fixed in place.

The transmit beamformer 12 is one or more waveform generators for generating a plurality of waveforms to be applied to the various elements of the transducer 14. By applying relative delays and apodizations to each of the waveforms during a transmit event, a scan line direction and origin from the face of the transducer 14 is controlled. The delays are applied by timing generation of the waveforms or by separate delay components. The apodization is provided by controlling the amplitude of the generated waveforms or by separate amplifiers. To scan a region of a patient, acoustic energy is transmitted sequentially along each of a plurality of scan lines. In alternative embodiments, acoustic energy is transmitted along two or more scan lines simultaneously or along a plane or volume during a single transmit event.

The receive beamformer 16 comprises delays and amplifiers for each of the elements in the receive aperture. The receive signals from the elements are relatively delayed and apodized to provide scan line focusing similar to the transmit beamformer 12, but may be focused along scan lines different than the respective transmit scan line. The delayed and apodized signals are summed with a digital or analog adder to generate samples or signals representing spatial locations along the scan line. Using dynamic focusing, the delays and apodizations applied during a given receive event or for a single scan line are changed as a function of time. Signals representing a single scan line are obtained in one receive event, but signals for two or more scan lines may be obtained in a single receive event. A component frame of data is acquired by scanning over a complete pattern with the beamformer. In alternative embodiments, a Fourier transform or other processing is used to form a component frame of data by receiving in response to a single transmit.

The detector 18 comprises a B-mode detector, Doppler detector or other detector. The detector 18 detects intensity, velocity, energy, variance or other characteristic of the signals for each spatial location in the component frame of data.

The scan converter 20 comprises a processor, filter, application specific integrated circuit or other analog or digital device for formatting the detected data from a scan line format (e.g., polar coordinate format) to a display or Cartesian coordinate format. The scan converter 20 outputs each component frame of data in a display format. The component frames may include values for locations representing regions outside of the display region. In one embodiment, each component frame has the same number of pixels and an associated image geometry corresponding to the display or overlap region as described in U.S. Pat. No. 6,790,181, the disclosure of which is incorporated herein by reference.

The compound processor 22 comprises one or more memories, processors, control processors, digital signal processors, application specific integrated circuits, filters, multiplexers, multipliers, adders, lookup tables and combinations thereof. In one embodiment, the compound processor 22 comprises a personal computer, motherboard, separate circuit board or other processor added to an ultrasound system for image processing using transfers of data to and from the ultrasound image generation pipeline or processing path (i.e. receive beamformer 16, detector 18, scan converter 20 and display 24). In other embodiments, the compound processor 22 is part of the image generation pipeline.

The compound processor 22 is a collection of matched filters or implements the collection. For example, discrete filter banks are used. As another example, a processor implements the filtering. The filtering may be programmable, allowing a same device to perform different filtering in parallel or sequentially. The same component of the compound processor 22 may perform variance calculations and/or erosion, or a separate device or devices are provided.

In one embodiment, FIGS. 4-6 represent the compound processor 22. Analog, digital, application specific integrated circuits, field programmable gate arrays or other arrangements implement the filtering, mean calculation, erosion, thresholding, segmenting, combining, compounding, summing, subtraction or other operations. In other embodiments, FIGS. 4-6 represent operation or configuration of one or more programmable devices. The compound processor 22 is configured by hardware and/or software.

The compound processor 22 is configured to perform matched filtering to substantially orthogonally filter steered frames. Each of the steered frames is filtered based on the steering angle or angles for the steered frame. The compound processor 22 is configured to detect spatial variance in the steered frames and erode the locations for one type of signals, such as signals at locations associated with anatomical structures.

The compound processor 22 is configured to segment locations of the overlap region or other scan region of the patient. The segmentation is performed as a function of the spatial variance, matched filtering output, or both spatial variance and output of the matched filtering. The segmentation is of locations for first and second types of signal, such as signals for anatomical structure, soft tissue, and/or other noise. Using the erosion and/or matched filtering outputs, the segmentation indicates locations associated with different information.

The segmentation is used to determine how to compound data from the steered frames for the different locations. Different compounding is provided for different locations. The contribution of different frames to the compounding is based on the type of object at the location. The type of object is determined by the segmentation based on the output from one or more different processes.

The compound processor 22 is configured to generate a compound image from the steered frames of data as a function of the locations for the different types of signal. The compound processor 22 is operable to combine or compound one or more component frames of data representing at least a same region for display. For example, the compound processor 22 comprises a memory and multiplier for each of the component frames and an adder connected to each of the multipliers for combining signals representing a given spatial location from each of the component frames of data in a finite impulse response filter format. Linear or non-linear combinations of component frames of data may be provided. The resulting compounded data is used to generate the image.

The compound processor 22 is operable to combine detected and scan converted data. In alternative embodiments, the compound processor 22 is positioned between the detector 18 and scan converter 20 for combining detected but not scan converted data, positioned prior to a log compressor of the detector 18 for combining non-compressed information or positioned prior to the detector 18. Any of various embodiments for combining multiple data representing the same region or combining component frames of data may be used.

In one embodiment, the compound processor 22 includes an image display plane or memory for each of the component frames, such as six display planes. Each display plane has foreground and background pages for allowing simultaneous writing to memory while reading out from memory, but other memory structures may be provided. The memory stores information for each spatial location, such as flow mode or Doppler mode parameter data, B-mode data, a color pan box information and the display region border information. A filter responsive to different multiplier coefficients combines the component frames using different functions based on the contribution. A lookup table provides the different weighting coefficients to the multipliers. Different coefficients may also be provided for combining different numbers of component frames.

The instructions for implementing the processes, methods and/or techniques discussed above are provided on non-transitory computer-readable storage media or memories 26, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

The display 24 is a CRT, monitor, flat screen, LCD, projection or other display for displaying the compounded ultrasound image. During the display refresh, the component frames are read, filtered, variance calculated, segmented, and compounded to generate the image on the display 24 where display plane memories are used for each component frame of data. The resulting frame of data is a compound image responsive to component frames of data. Different locations have values from different component frames or from multiple or all of the component frames. The display image format or display region is trapezoidal, trapezoidal like, rectangular, sector, pie shaped, Vector® or other shape. The compound image is updated in real-time, such as updating the compound image as each new component frame of data is acquired and a previous component frame of data is removed from a previous compound image or is removed from a buffer for compounding the next compound image. Alternatively, real-time compounding is provided by compounding different sets of component frames of data with no or few component frames used in common for each set. In yet other alternative embodiments, offline or non-real time compounding is provided.

The display 24 is operable to display a compound image responsive to the component frames of data. The compound image reduces speckle while maintaining signal-to-noise ratio. The combined frame of data is displayed as the compound image. Component frames of data may be used to generate images without compounding.

In another alternative embodiment, the transducer 14 is moved during acquisition of the component frames of data. The compounded image represents an extended field of view. As different views are compounded together, the different directions of the ultrasound beams incident on the same locations provide steered compounding. U.S. Pat. Nos. 5,566,674, 5,575,286, 5,782,766 and 6,014,473 describe various techniques for extended field of view imaging and are incorporated herein by reference.

Other alternative embodiments include use for compounding in three or four-dimensional images. Component frames of data are acquired with different lateral as well as elevation steering angles. Matched filtering and/or spatial variance and erosion for segmentation is used in three or four-dimensional imaging.

While the invention has been described above by reference to various embodiments, it should be understood that many changes and modifications can be made without departing from the scope of the invention. While the description herein provides examples of steered spatial compounding, other compounding, such as temporal or frequency compounding, may alternatively or additionally be used. Steering may be relative to the transducer (e.g., beamformer steering) and/or relative to the location being scanned (e.g., insonifying from different directions with or without beamformer steering). It is therefore intended that the foregoing detailed description be regarded as illustrative rather than limiting, and that it be understood that it is the following claims, including all equivalents, that are intended to define the spirit and scope of this invention.

We claim:

1. A method for spatial compounding in ultrasound imaging, the method comprising:
   acquiring steered component frames of data, each of the steered component frames of data representing a same overlap region of a patient and being responsive to different imaging angles;
   filtering, with matched filters, each of the steered component frames of data along different directions, the filtering providing multiple filtered component frames of data for each steered component frame of data;
   combining the multiple filtered component frames of data for each of the steered component frames, the combining providing a combined component frame of data for each of the steered component frames of data;
   segmenting the combined component frames;
   compounding the combined component frames of data together as a function of the segmenting; and
   generating an image of the overlap region from a result of the compounding.

2. The method of claim 1 wherein acquiring comprises scanning along scan lines where a majority of the scan lines for each steered component frame of data are at a same angle to the transducer and the angle is different for the different steered component frames of data.

3. The method of claim 1 wherein filtering comprises filtering with a first of the different directions being substantially along a scan line direction and a second of the different directions being substantially orthogonal to the scan line direction.

4. The method of claim 1 wherein filtering and combining comprise enhancing anatomic structures relative to noise and soft tissue, different portions of the anatomic structures enhanced in different of the combined component frames due to the different imaging angles of the steered component frames.

5. The method of claim 1 wherein combining comprises subtracting the multiple filtered component frames of data associated with a same of the steered component frames.

6. The method of claim 1 wherein filtering each of the steered component frames comprises filtering with the different directions being different for different ones of the steered component frames of data.

7. The method of claim 1 wherein segmenting comprises applying a threshold to the combined component frames, locations above the threshold indicating anatomical structure and locations below the threshold indicating soft tissue, noise, or soft tissue and noise.

8. The method of claim 1 wherein compounding comprises compounding linearly for locations of soft tissue, noise, or soft tissue and noise and compounding non-linearly for locations of anatomical structure.

9. The method of claim 1 wherein generating the image comprises generating a steered spatial compound image.

10. The method of claim 1 further comprising:
calculating spatial variance for each of the steered component frames of data; and
segmenting between anatomical structure and soft tissue as a function of the spatial variance;
wherein compounding comprising compounding as a function of the segmenting from the spatial variance and the segmenting from the combined component frames.

11. The method of claim 10 further comprising:
applying erosion to the spatial variance prior to segmenting as a function of the spatial variance.

12. A non-transitory computer readable storage medium having stored therein data representing instructions executable by a programmed processor for spatial compounding in ultrasound imaging, the storage medium comprising instructions for:
identifying first information in component frames of data having different spatial response, the first information identified with matched filtering;
identifying second information in the component frames of data as a function of variance;
segmenting locations in an overlap region represented by the component frames of data into anatomic structures and at least another type, the segmenting being a function of the first and second information;
combining the component frames of data for each of the locations, the combining being different for the locations associated with anatomic structures than for the locations associated with the at least other type; and
generating a spatially compound image as a function of the combining.

13. The non-transitory computer readable storage medium of claim 12 further comprising acquiring the component frames of data, the component frames of data representing an overlap region of a patient and being responsive to different imaging angles.

14. The non-transitory computer readable storage medium of claim 12 wherein identifying the first information with matched filtering comprises:
filtering each of the component frames of data along substantially orthogonal directions, the substantially orthogonal directions being set relative to scan line directions of the respective component frames of data, the filtering providing multiple filtered component frames of data for each component frame of data;
subtracting one of the multiple filtered component frames of data for one of the component frames of data from another of the multiple filtered component frames of data for the one of the component frames of data, the subtracting providing the first information for the one of the component frames of data; and
repeating the subtracting of the other of the component frames of data.

15. The non-transitory computer readable storage medium of claim 12 wherein identifying the second information comprises:
calculating the variance as a spatial variance for each of the component frames of data; and
applying erosion to the spatial variance prior to segmenting, the eroded spatial variance comprising the second information.

16. The non-transitory computer readable storage medium of claim 12 wherein segmenting the locations comprises segmenting the locations as corresponding to anatomic structures where both the first and second information indicate the anatomic structure and corresponding to soft tissue and noise at other locations.

17. The non-transitory computer readable storage medium of claim 12 wherein combining comprises selecting a maximum of the data for the locations associated with the anatomic structures and averaging the data for the locations associated with the at least other type.

18. The non-transitory computer readable storage medium of claim 12 wherein combining the component frames of data comprises combining frames of data derived from the component frames of data.

19. A system for steered spatial compounding in ultrasound imaging, the system comprising:
a beamformer operable to acquire a sequence of steered frames of data responsive to different steering angles from a substantially same transducer position and representing an overlap region;
a processor configured to detect spatial variance in the steered frames, segment locations of the overlap region as a function of the spatial variance into locations for first and second types of signal, erode the locations for the first type of signals, and generate a compound image from the steered frames of data as a function of the locations for the first and second types of signal after the erosion; and
a matched filter operable to substantially orthogonally filter the steered frames, each of the steered frames filtered based on the steering angle or angles for the steered frame, wherein the processor is configured to segment as a function of both the spatial variance and output of the matched filter;
a display operable to display the compound image.

* * * * *